United States Patent
Penkov et al.

(10) Patent No.: US 9,473,062 B2
(45) Date of Patent: Oct. 18, 2016

(54) METHOD FOR CONTROLLING A CONTROLLED SWITCH OPERATING THE POWER SUPPLY OF AN ELECTRIC MOTOR

(75) Inventors: Delcho Penkov, Saint Martin d'heres (FR); Alain Cote, Echirolles (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 68 days.

(21) Appl. No.: 14/343,685

(22) PCT Filed: Sep. 10, 2012

(86) PCT No.: PCT/FR2012/052012
§ 371 (c)(1),
(2), (4) Date: Mar. 7, 2014

(87) PCT Pub. No.: WO2013/038094
PCT Pub. Date: Mar. 21, 2013

(65) Prior Publication Data
US 2014/0225554 A1    Aug. 14, 2014

(30) Foreign Application Priority Data
Sep. 13, 2011    (FR) ...................................... 11 02767

(51) Int. Cl.
| H02P 1/24 | (2006.01) |
| H02P 21/00 | (2016.01) |
| H02P 27/02 | (2016.01) |
| H02P 1/02 | (2006.01) |
| H02P 1/28 | (2006.01) |

(52) U.S. Cl.
CPC ............... *H02P 27/02* (2013.01); *H02P 1/028* (2013.01); *H02P 1/28* (2013.01)

(58) Field of Classification Search
USPC ......................................... 318/729, 368, 799
See application file for complete search history.

(56) References Cited

U.S. PATENT DOCUMENTS

| 4,916,370 | A | * | 4/1990 | Rowan | ...................... H02P 3/18 318/368 |
| 5,008,608 | A | * | 4/1991 | Unsworth | ............... H02P 27/02 318/729 |
| 6,407,529 | B1 | | 6/2002 | Gritter et al. | |
| 2007/0046247 | A1 | * | 3/2007 | Barie | .................... H02P 27/023 318/799 |

FOREIGN PATENT DOCUMENTS

| WO | 01/89072 | 11/2001 |
| WO | 2006/034977 | 4/2006 |

OTHER PUBLICATIONS

International Search Report issued May 6, 2013 in PCT/FR12/52012 filed Sep. 10, 2012.

* cited by examiner

*Primary Examiner* — Eduardo Colon Santana
*Assistant Examiner* — Cortez Cook
(74) *Attorney, Agent, or Firm* — Oblon, McClelland, Maier & Neustadt, L.L.P.

(57) ABSTRACT

A method for controlling a controlled switch operates a power supply of an electric motor from an AC voltage source. The method includes actuating closure of the controlled switch, an instant of actuation of which is dependent on a value characteristic of a value of an electric voltage across terminals of the controlled switch. A control device for such a controlled switch includes elements for implementing the method.

16 Claims, 5 Drawing Sheets

METHOD FOR CONTROLLING A CONTROLLED SWITCH OPERATING THE POWER SUPPLY OF AN ELECTRIC MOTOR

BACKGROUND

The present invention relates to a method for controlling a controlled switch operating the power supply of an electric motor from an AC voltage source. The invention also relates to a data recording medium readable by a computer on which a program is recorded comprising software elements for implementation of the steps of such a method. The invention further relates to a control device of a controlled switch operating the electric power supply of a motor from an AC voltage source. The invention finally relates to a system comprising one such control device.

STATE OF THE ART

Starting of an electric motor gives rise to certain problems. Indeed, when it is started, the motor draws a large inrush current from the electric power system which supplies it with power. This results in a voltage drop on the power system which may lead to malfunctioning of certain sensitive loads. This can also cause load-shedding on the power system.

To avoid this problem, it is known not to connect an electric motor directly to the power system when starting. To do this, the motor is connected to the power system via a starting system enabling the drawbacks mentioned above to be avoided.

The motor can for example be connected to the power system via a device enabling the speed of the motor to be controlled. For example, such a device comprises a frequency converter. Such a device is cost-prohibitive, especially if it is only used during the starting phase.

Therefore, to avoid high costs, the motor can also be connected to the power system via a progressive starting system by controlled switches enabling the rms value of the voltage applied to the motor to be progressively increased. Such a system is known in particular from the document WO 01/89 074. In such systems, the controlled switches are achieved by means of semiconductor components, in particular thyristors. Controlled switches are therefore fragile and sensitive to the transient voltages and currents to which they are subjected when commutation takes place. It is commonplace to use the same progressive starting system to start several motors in sequential manner. It can therefore be understood that a malfunction on the starting system can cause substantial production losses in certain applications. It therefore appears of paramount importance to ensure dependability of operation of these starting systems, in particular to ensure dependability of operation of starting systems having rated voltages that are greater than 500 V, even greater than 1000 V, or even equal to or greater than 5.5 kV, on account of the values of the transient voltages and currents to which the controlled switches are subjected in these cases.

SUMMARY OF THE INVENTION

One object of the invention is to provide a method for controlling a controlled switch enabling the problems referred to in the foregoing to be remedied and improving known control methods of the prior art. In particular, the invention proposes a simple and efficient control method enabling the lifetime of the controlled switch to be enhanced thereby rendering systems integrating such a controlled switch more dependable.

This object is achieved by a method for controlling a controlled switch operating the power supply of an electric motor from an AC voltage source, comprising a step of actuating closure of the controlled switch, the moment of actuation being dependent on a value characteristic of the value of the electric voltage across the terminals of the controlled switch.

Preferably, the method for controlling comprises the following steps:
  a step of determining at least one value characteristic of a variation of the voltage value across the terminals of the controlled switch,
  a step of determining a first time range from the characteristic value, and
  the step of actuating closure of the controlled switch being performed during the first time range.

Advantageously, the step of determining at least one value characteristic of the variation is implemented by measurement and/or by computation in a configuration phase of the method, in particular a test phase, or in an implementation phase of the method.

Advantageously, the value characteristic of the variation comprises a value representative of the time period of the variations of a voltage value across the terminals of the controlled switch following opening of the controlled switch.

Preferably, the method for controlling according to one of claims 2 to 4 is characterized in that the first time range is defined as comprising the set of times t verifying the following formulas:

$$\begin{cases} t - t_{I0} < TK(k + x) \\ t - t_{I0} > TK(k + 1 - y) \\ k \in [0 \ldots n] \end{cases}$$

with
$t_{I0}$: the time at which opening of the controlled switch takes place,
TK: the period of the variation of the voltage value across the terminals of the controlled switch,
n: a natural integer, for example n=10.

Advantageously, x is comprised between 0 and 0.3, preferably comprised between 0 and 0.25, preferably comprised between 0 and 0.2 and/or y is comprised between 0 and 0.3, preferably comprised between 0 and 0.25, preferably comprised between 0 and 0.2.

Preferably, the method comprises the use of a triggering time value defining a second time range, the step of actuating closure of the controlled switch taking place as soon as the time common to the first time range and to the second time range occurs.

Preferably, the second time range is defined as comprising the set of times t verifying the following formula:

$$|t - t_{V0} - \alpha| < \frac{TK}{2}$$

with
$T_{V0}$: the time when the AC voltage of the source is zero,
TK: the period of the variation of the voltage value across the terminals of the controlled switch,
$\alpha$: a time that is shorter than the half-period of the AC voltage of the source.

A data recording medium according to the invention readable by a computer on which a program is recorded comprises software elements for implementation of the steps of the method as defined in the foregoing.

A control device of a controlled switch operating the electric power supply of a motor from an AC voltage source comprises hardware and/or software elements for implementing the method as defined in the foregoing.

Preferably, the controlled switch comprises a thyristor.

A system, in particular an electric motor starting system, according to the invention comprises a control device as defined in the foregoing.

The invention also relates to a computer program comprising computer program code means suitable for performing the steps of the method defined in the foregoing, when the program is running on a computer.

BRIEF DESCRIPTION OF THE DRAWINGS

The appended drawings represent, for example purposes, a mode of execution of a method for controlling a controlled switch according to the invention and an embodiment of a device for controlling a controlled switch according to the invention.

DETAILED DESCRIPTION OF PREFERRED EMBODIMENTS

Figure 1:
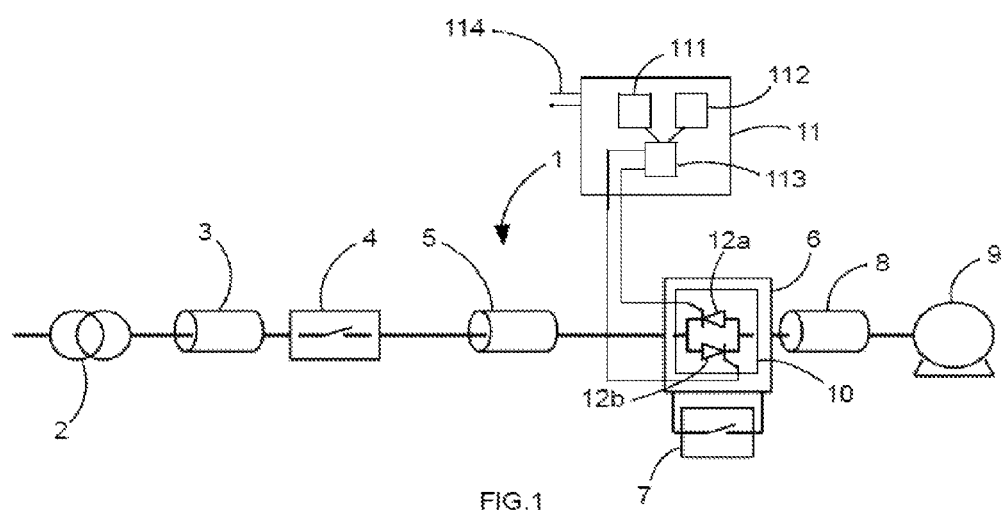
FIG. 1 is an electric diagram of an installation comprising an embodiment of a device for controlling a controlled switch according to the invention.
Figure 2:
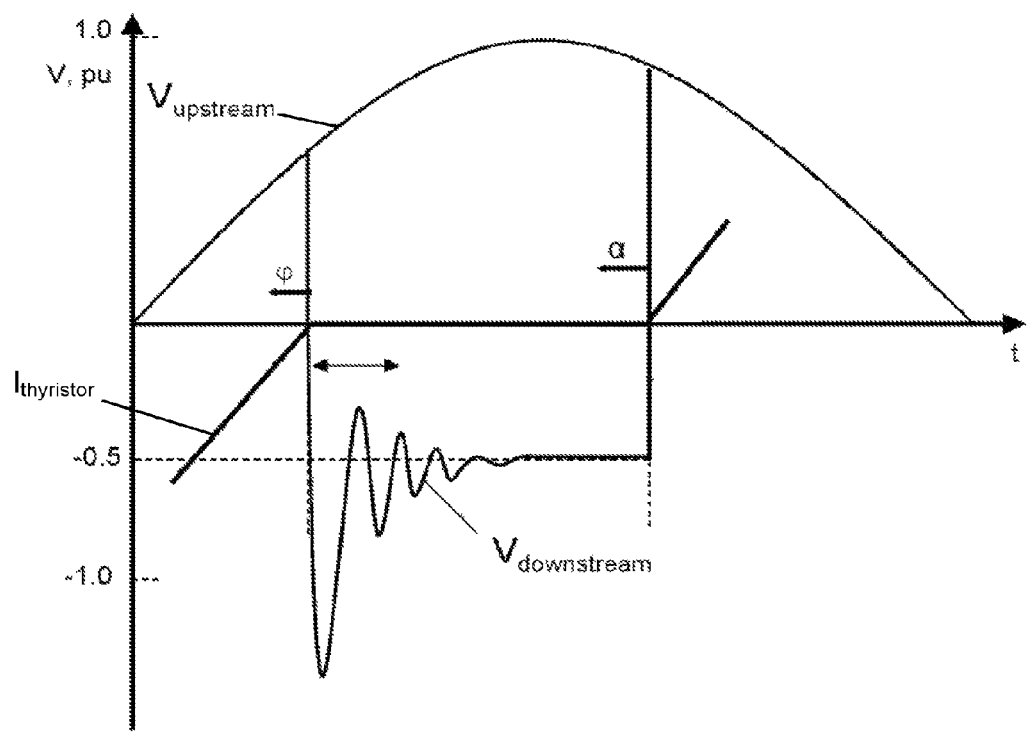
FIG. 2 is a time-based graph, over a half-period, of the variations of the current flowing in a controlled switch and of the electric voltages upstream and downstream from the controlled switch.
Figure 3:
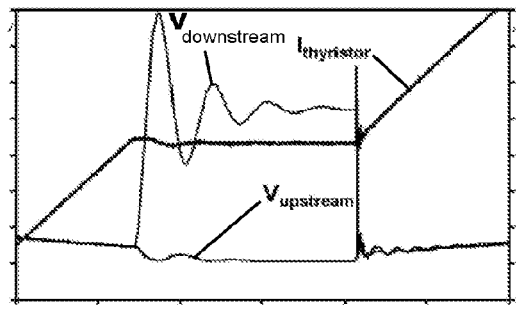
FIG. 3 is a time-based graph of the variations of the current flowing in a controlled switch and of the electric voltages upstream and downstream from the controlled switch, when the current in the thyristor drops to zero and is naturally interrupted, and then when closing commutation of the controlled switch takes place.
Figure 4:
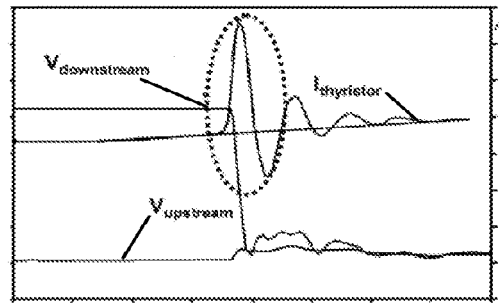
FIG. 4 is a time-based graph of the variations of the current flowing in a controlled switch and of the electric voltages upstream and downstream from the controlled switch, when closing commutation of the controlled switch takes place.

An embodiment of an installation 1 according to the invention is described in the following with reference to FIG. 1. The installation mainly comprises an electric motor 9 supplied by a voltage source 2. The voltage source, formed for example by a transformer, is connected to a circuit breaker 4 via a first cable 3. This circuit breaker is connected to a motor starting system 6 via a second cable 5. This starting system is connected to the motor 9 via a third cable 8. A contactor device is arranged in parallel with the starting system. It enables the starting system to be short-circuited once the motor has reached a sufficient speed.

The motor is of AC type, in particular of asynchronous type. It is a three-phase motor. Its rated voltage is greater than 500 V, or even greater than 1000 V, or even greater than or equal to 5.5 kV.

The motor is therefore connected to the electric power system, in particular to the voltage source 2, via a motor starting system 6.

The motor starting system mainly comprises a controlled switch 10 on each power supply line of the motor, for example a controlled switch on each of the three power supply phases of a three-phase motor. The controlled switch can be a power transistor. Advantageously, the controlled switch comprises a thyristor 12a, 12b, in particular two thyristors 12a, 12b connected head-to-tail in parallel.

The motor starting system also comprises a control device 11 of the controlled switch. In the case represented, the control device comprises two outputs each attacking a trigger of the thyristors 12a, 12b. The control device thus enables a pulse to be generated commanding triggering of commutation of each of the thyristors from its off state to its on state.

To do this, the control device 11 comprises a first module 111 determining a first time range, for each half-wave of the AC voltage of the voltage source, according to a logic which will be described in detail further on. The control device further comprises a second module 112 determining a second time range, for each half-wave of the AC voltage of the voltage source, from a value of angle α of triggering commutation of the controlled switch proper to obtaining a rms voltage value suitable for starting of the motor. The angle α is for example defined with respect to the last moment when the voltage of the source was zero. An angle of π represents a full wave. It is clear that, throughout the motor starting phase, this value of angle α varies so that the rms voltage applied to the motor increases progressively. The logic for determining the second time range will be set out in detail further on.

The control device 11 further comprises a third module 113 using the previously defined first and second time ranges. This third module confronts the first and second time ranges and, as soon as a time common to the first and second time ranges occurs, it emits a control pulse of the controlled switch, in particular a pulse commanding closing commutation of one of the two thyristors. Naturally, opening commutation of a thyristor takes place when the current flowing in this thyristor is zero.

To determine the first and second time ranges, the control device, in particular the first and second modules, uses information represented by the reference numeral 114 and comprising for example the speed of rotation of the motor and/or the rated voltage of the motor and/or the power of the motor and/or the intensity of the supply current of the motor and/or any data of an electric characteristic of the power system, of the connecting cables and of the motor. This information can be measured, estimated, computed or entered.

Once the motor has reached its nominal speed or once the motor has reached a threshold speed, the starting system is short-circuited by means of a contactor 7.

As represented in FIGS. 2 to 4 and 11, in an application as defined in the foregoing, following an opening commutation of a thyristor at a time $t_{I0}$), a voltage occurs across the terminals of the thyristor. The upstream voltage of the thyristor is fixed by the voltage source and represented by the curve $V_{upstream}$. The downstream voltage of the thyristor represented by the curve $V_{downstream}$ downstream from the thyristor for its part comprises a substantially DC component during the interruption period and a transient and oscillatory component. This results in the voltage existing between the terminals of the thyristor being represented by the difference existing between the curves $V_{upstream}$ and $V_{downstream}$. In the same way, the intensity of the current flowing through the thyristor is represented by the curve $I_{thyristor}$. Opening commutation of the thyristor is caused by the intensity of this current being zero. On the other hand, as soon as the thyristor switches back to its on state, the current flowing through the thyristor increases substantially and can, in the first moments after the closing order, be closely compared to a dampened high-frequency sine wave. It can in particular be observed that a transient and oscillatory current appears flowing through the thyristor on closing commutation of the latter. It can also be observed that the transient component of the current flowing through the controlled switch following closing commutation of the latter is proportional to the voltage present across the terminals of the controlled switch just before this commutation. Consequently, the higher the voltage across the terminals of the controlled switch, the greater the stress on the controlled switch following its closing commutation. Furthermore, the greater the stress on the controlled switch, the more limited its lifetime. Thus, the greater the stress on the controlled switches of a motor starting device, the more its dependability is reduced. This problem could be remedied by using robust or dependable controlled switches, capable of withstanding large stresses. Such components are however very costly. Protection devices enabling high transient current intensities to be avoided could also be used in the circuit. Such protection devices are also costly. Such devices furthermore have to be fitted in the installations.

The control device described in the foregoing comprises all the hardware and/or software elements necessary for implementation of the control method that is the object of the invention. In particular, the control device comprises an element actuating or commanding closure of the controlled switch according to a value characteristic of the value of the electric voltage across the terminals of the controlled switch. It preferably comprises an element for determining at least one characteristic value of a variation of the value of the voltage across the terminals of the controlled switch, an element for determining a first time range from the characteristic value and an element for actuating closure of the switch during the first time range. It preferably comprises an element for determining a second time range from the characteristic value and an element for actuating closure of the switch during the first time range. All these elements can comprise software elements.

Figure 9:
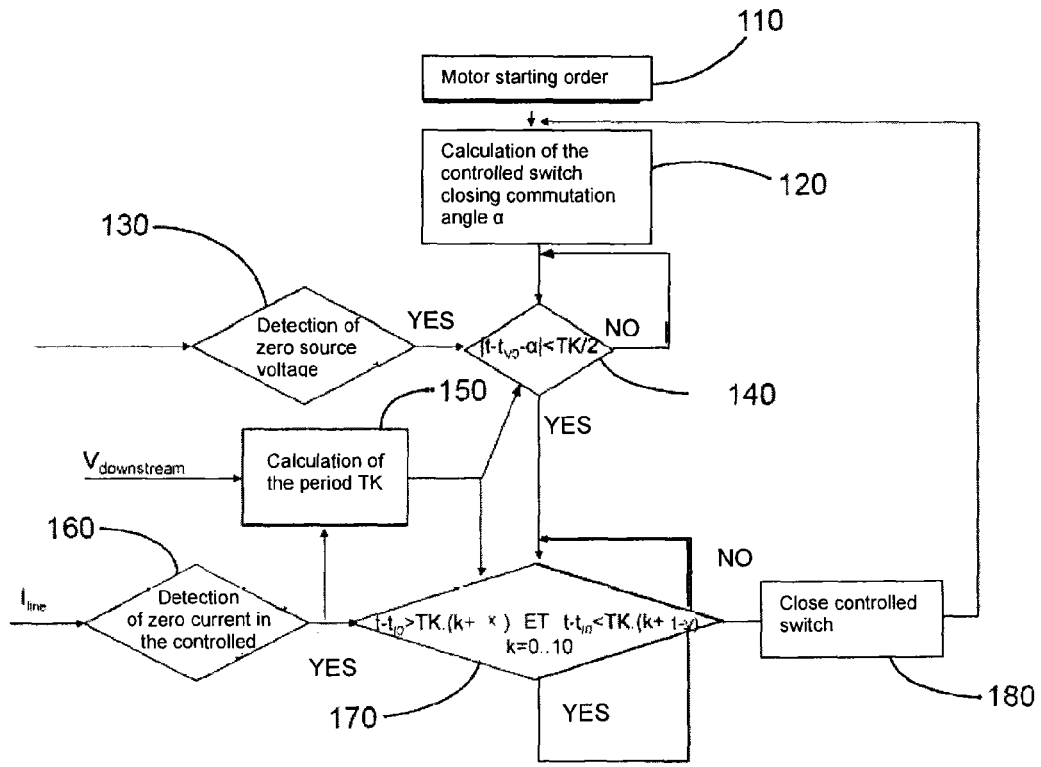
FIG. 9 is a flowchart of a mode of execution of a method for controlling a controlled switch according to the invention.

To avoid these drawbacks, the controlled switch according to the invention is controlled. A first mode of execution of the method for controlling a controlled switch according to the invention is described hereafter with reference to FIG. 9.

In a first step 110, starting of the motor 9 is commanded.

In a second step 120, the time at which the controlled switch 10 has to be switched to closure is calculated. This time is usually defined by an angle α translating the period separating the time $t_{I0}$ when the voltage of the AC source becomes zero and the commutation time, the angle π representing a full-wave of the voltage of the AC source. This angle α is defined according to different parameters, in particular the mechanical torque required on starting, being translated by a rms voltage to be reached at its terminals. In the starting phase, the more the speed increases, the more the opening time of the controlled switch decreases. This results in the rms value of the electric voltage applied to the motor increasing progressively.

In a third step 130, the voltage upstream from the controlled switch is measured and the time $t_{V0}$ at which the voltage of the electric source drops to zero is detected. As soon as this moment is detected, the method goes on to a fourth step 140.

In the fourth step 140, calculation is performed of the absolute value of the difference between:
 the period separating the present time and the time $t_{V0}$, and
 the time period defined by the angle α.

Figure 11:
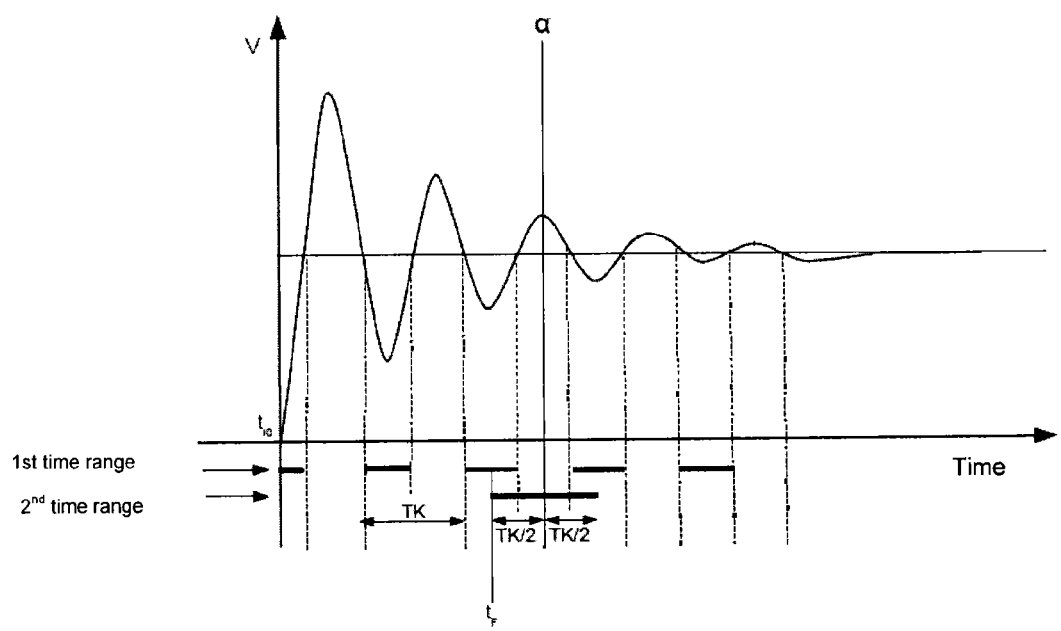
FIG. 11 is a time-based graph of the variations of the voltage across the terminals of a controlled switch following opening commutation of the latter.

It is further checked whether this absolute value is lower than the half-period TK/2 of the oscillations of the voltage across the terminals of the controlled switch following an opening commutation of this controlled switch. If this is the case, the method goes on to a step 170. In other words, a time range around the moment determined by the angle α, in particular centred on the moment determined by the angle α, is defined in this step 140. This time range defines the moments when closing commutation of the controlled switch has to be triggered in order to obtain a rms voltage value applied to the motor that is adequate. This time range is represented in FIG. 11 under the designation "second time range".

In a fifth step 150, the voltage downstream from the controlled switch is measured, this voltage is analysed and the value of the period TK of the oscillations of the voltage across the terminals of the controlled switch following an opening commutation of this controlled switch is deduced therefrom. This value is used in steps 140 and 170.

In a sixth step 160, the intensity of the current flowing through the controlled switch is measured and the time $t_{I0}$ when this current becomes zero is detected. As soon as this time is detected, the method goes on to step 170. The information of detection of this zero current is also sent in step 150 so as to start analysis of the voltage downstream from the controlled switch.

In step 170, the period separating the present time and time tI0 is calculated, and it is checked:
whether this period is greater than TK(k+x) and
whether this period is less than TK(k+1−y)
with
k: a variable of natural integer type such that k∈[0 . . . n]
n: a natural integer, for example n=10 or 15 or 12. n can also take any integer value comprised between 1 inclusive and 9 inclusive.
x is advantageously comprised between 0 and 0.3, preferably comprised between 0 and 0.25, and preferably comprised between 0 and 0.2
y is advantageously comprised between 0 and 0.3, preferably comprised between 0 and 0.25, and preferably comprised between 0 and 0.2.
Even more preferably x=y.

If this is the case, looping is performed on this step 170 and, if this is not the case, the method proceeds to a step 180 in which closure of the controlled switch is commanded, and the method then loops back to step 120.

In other words, in step 170 a time range is defined during which the value of the voltage across the terminals of the controlled switch is minimized, i.e. is substantially lower than a given threshold. In particular, with a value x=0.25 and a value y=0.25, a time range is obtained corresponding to the times during which the negative half-waves of the AC component of the voltage across the terminals of the controlled switch occur. It can be observed that the time range defined in this step is discontinuous. With a value x=0.25 and a value y=0.25, each period of the time range has a duration of about TK/2. Naturally, after a period TK(n+1−y), the time range is no longer interrupted until the end of the current half-wave of the voltage of the voltage source. This time range is partially represented in FIG. 11 under the designation "first time range". This time range enables it to be ensured that the voltage across the terminals of the controlled switch is not too high when closure of the controlled switch is commanded.

Ultimately, it can be observed that the controlled switch is switched to closure as soon as the first time $t_F$ common to the first and second time ranges occurs, as represented in FIG. 11. A slight time lag therefore occurs relatively to the value a computed in step 120, but this time lag is small on account of the frequency TK of the oscillations of the voltage and its influence on the rms value of the voltage applied to the motor is therefore quite negligible or does not give rise to any drawbacks affecting the global operation of the progressive starter.

This method is iterated on each half-wave of the AC voltage of the voltage source. Two time ranges are thereby defined per half-wave of the AC voltage of the source. Obviously, when a controlled switch comprising a first thyristor and a second thyristor is used, the first thyristor is used on the positive half-waves and the second thyristor is used on the negative half-waves.

A second mode of execution of the method for controlling according to the invention (not represented) differs from the first mode of execution described in the foregoing in that it does not comprise a step 150. In this embodiment, the period TK of the oscillations of the voltage across the terminals of the controlled switch following an opening commutation of this controlled switch is determined in another manner. In this case, a prior procedure of determining the period TK of the oscillations is for example used. Thus, in a step 210, parameters relative to the cables of the power system and parameters relative to the protection circuit located at the level of the starting system are collected and an equivalent capacitance of the system is computed. In parallel manner, in a step 220, parameters relative to the motor, in particular its power, voltage, and current intensity, are collected and an equivalent inductance of the system is computed. In a step 230, the previously computed equivalent capacitances and inductances are used to determine the period TK of the oscillations.

Figure 5:
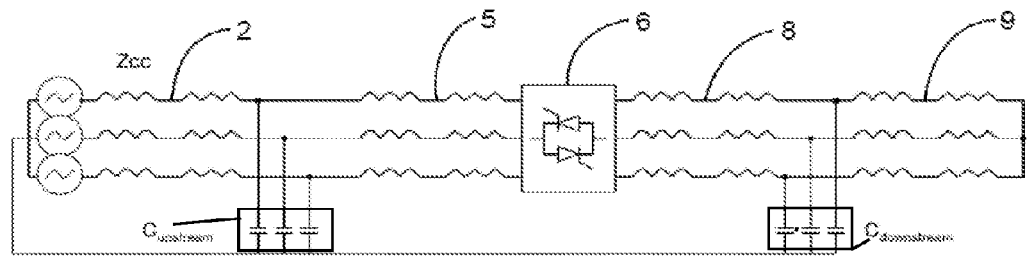
FIG. 5 is an equivalent wiring diagram of an electric installation as represented in FIG. 1.

It can indeed be observed that the installation 1 can be modelled as represented in FIG. 5.

Figure 6:
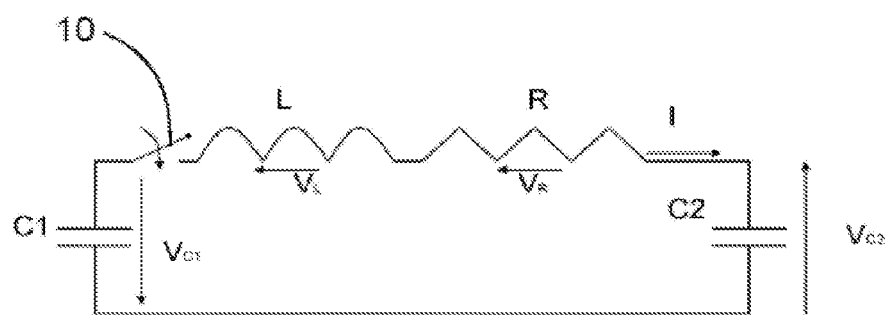
FIG. 6 is an equivalent wiring diagram of the electric installation when closing of a controlled switch takes place.

In particular, as represented in FIG. 6, when closing commutation of the controlled switch takes place, modelling of the installation can be further simplified. Thus, using the following formulas:

$$\frac{dI(t)}{dt} = I(t)|_{t=1\mu s} = \frac{-(V_{C1}+V_{C2})}{w_{current} \cdot L} \cdot e^{-10^{-6}/T} \cdot \sin(w \cdot 10^{-6})$$

$$w_{current} = \frac{1}{\sqrt{L \cdot \frac{C1 \cdot C2}{C1+C2}}}$$

$$T = \frac{2L}{R}$$

the period T of the oscillations of the current flowing through the controlled switch can be determined. The frequency of the oscillations is about a few tens of kHz.

Figure 7:
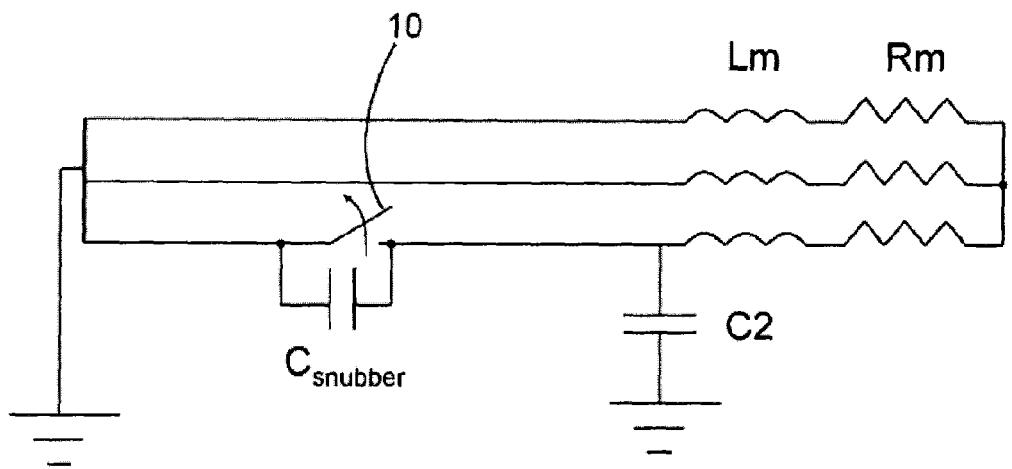
FIG. 7 is an equivalent wiring diagram of the electric installation when opening of a controlled switch takes place.
Figure 8:
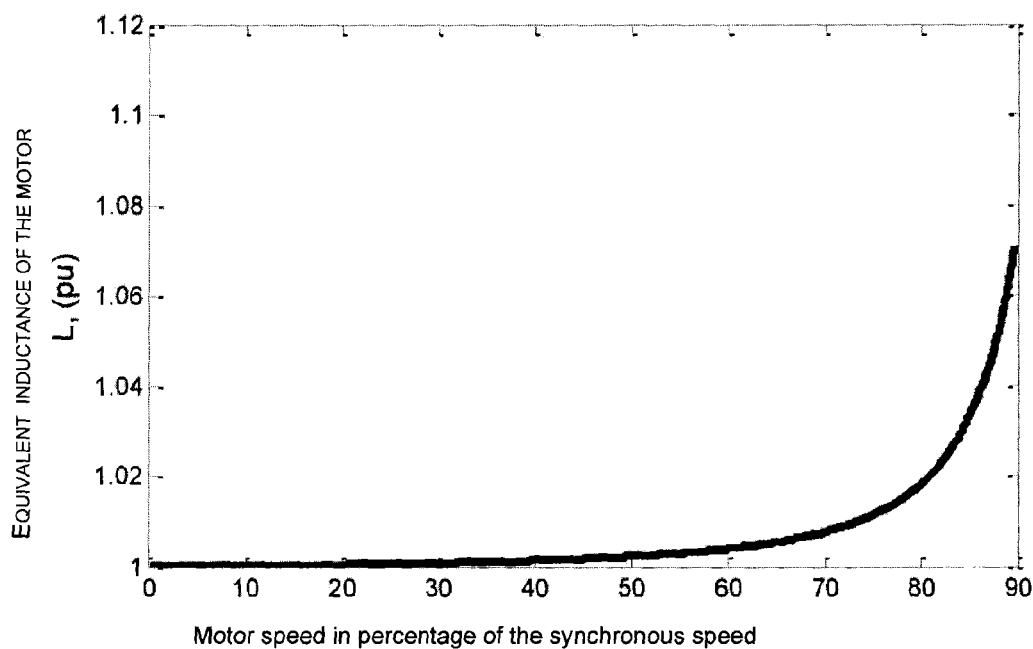
FIG. 8 is a graph representing the variation of the equivalent inductance of the motor versus its speed of rotation.

In the same manner, as represented in FIG. 7, when opening commutation of the controlled switch takes place, modelling of the installation can be further simplified. Thus, using the following formulas:

$$F_{downstream\_voltage} = \frac{1}{2 \cdot \pi \cdot \sqrt{L_{eq} \cdot C_{eq}}}$$

$$L_{eq} = Lm + \frac{1}{2}Lm = \frac{3}{2}Lm$$

$$C_{eq} = C_{snubber} + C2$$

the frequency of the oscillations of the voltage across the terminals of the controlled switch following opening of the controlled switch can be determined. The frequency of the oscillations is about several kilohertz.

A third mode of execution of the method for controlling according to the invention (not represented) differs from the first mode of execution described in the foregoing in that it does not comprise a step 150. In this embodiment, the period TK (or the frequency) of the oscillations of the voltage across the terminals of the controlled switch following an opening commutation of this controlled switch is determined in a testing or learning phase or throughout starting of the motor.

Figure 10:
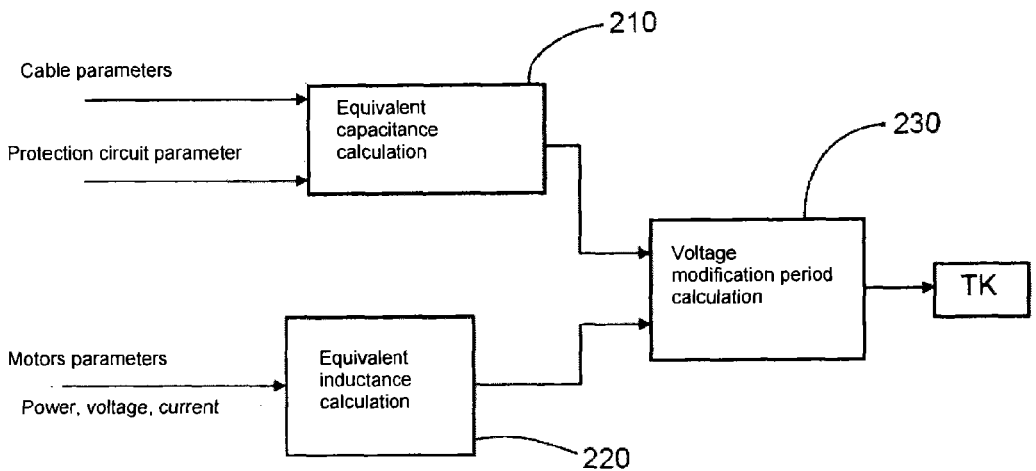
FIG. 10 is a flowchart of an example of a procedure for determining the period of the variation of the voltage across the terminals of a controlled switch following opening commutation of the latter.

In practice, the equivalent inductance of the motor can show much larger variations than that presented in FIG. 10, for several reasons:
  on account of the acceleration,
  on account of a variation with the speed of the inductances of the stator or of the rotor and/or of the magnetization of the motor.

It may therefore be appropriate to use sophisticated methods of estimating the equivalent inductance of the motor to obtain its most precise value throughout starting of the motor.

In the different modes of execution dealt with above, a step of actuating closure of the controlled switch is implemented, the actuating step depending on the characteristic value of the electric voltage across the terminals of the controlled switch. In particular, time ranges are preferably chosen during which the value of the voltage across the terminals of the controlled switch is minimized to command closure of the controlled switch.

In particular, at least one value TK characteristic of the variation of the value of the voltage across the terminals of the controlled switch is determined, a first time range is determined from the characteristic value and closure of the controlled switch is actuated, closure being performed in the course of the first time range.

The device and method according to the invention presents numerous advantages:
  they enable the intensity of the transient currents on closure commutations of the controlled switches to be reduced,
  they enable the risks of malfunctioning of motor starting systems which are equipped therewith to be reduced,
  they avoid protection devices having to be used, they enable the lifetime of the controlled switches to be increased.

Furthermore, the method according to the invention can be implemented by simple software updating of an existing control device.

The invention claimed is:

1. A method for controlling a controlled switch operating a power supply of an electric motor from an AC voltage source, the method comprising:
   determining a characteristic of a variation of a voltage value across terminals of the controlled switch, the characteristic of the variation of the voltage value being a constant period of voltage value variations;
   determining a first time range based on the constant period of the voltage value variations, the first time range being less than the constant period of the voltage value variations;
   outputting a control signal to actuate closure of the controlled switch during the first time range; and
   using a triggering time value defining a second time range, the second time range being the constant period of the voltage value variations, and the second time range being divided by a determined controlled switch closing commutation angle,
   wherein said outputting the control signal to actuate closure of the controlled switch takes place as soon as a time common to the first time range and to the second time range occurs.

2. The method for controlling according to claim 1, wherein said determining the characteristic of the variation of the voltage across the terminals of the controlled switch is implemented using measurement circuitry and/or by computation in a configuration phase a test phase or an implementation phase of the method.

3. The method for controlling according to claim 1, wherein the characteristic of the variation of the voltage across the terminals of the controlled switch includes a value corresponding to a time period of the variations of the voltage value across the terminals of the controlled switch following opening of the controlled switch.

4. The method for controlling according to claim 1, wherein the first time range is defined as including a set of times t verifying the following formulas:

$$\begin{cases} t - t_{I0} < TK(k + x) \\ t - t_{I0} > TK(k + 1 - y) \\ k \in [0 \ldots n] \end{cases}$$

with
   $t_{I0}$: the moment of opening of the controlled switch,
   TK: a period of variation of a voltage value across the terminals of the controlled switch,
   n: a natural integer,
   x: zero or greater,
   y: zero or greater, and
   k: a natural integer.

5. The method for controlling according to claim 4, wherein x is between 0 and 0.3, or is between 0 and 0.25, or is between 0 and 0.2, and/or y is between 0 and 0.3, or is between 0 and 0.25, or is between 0 and 0.2.

6. The method for controlling according to claim 1, wherein the second time range is defined as including a set of times t verifying following formula:

$$|t - t_{V0} - \alpha| < \frac{TK}{2}$$

with
   $t_{V0}$: a time when the AC voltage of the AC voltage source is zero, TK: the constant period of variation of the voltage value across the terminals of the controlled switch, and
   α: a time that is shorter than a half-period of an AC voltage of the AC voltage source.

7. A non-transitory computer-readable storage medium storing computer-readable instructions that, when executed by a computer, cause the computer to perform a method comprising:
   determining a characteristic of a variation of a voltage value across terminals of the controlled switch, the characteristic of the variation of the voltage value being a constant period of voltage value variations;
   determining a first time range based on the constant period of the voltage value variations, the first time range being less than the constant period of the voltage value variations;
   outputting a control signal to actuate closure of the controlled switch during the first time range; and
   using a triggering time value defining a second time range, the second time range being the constant period of the voltage value variations, and the second time range being divided by a determined controlled switch closing commutation angle,
   wherein said outputting the control signal to actuate closure of the controlled switch takes place as soon as a time common to the first time range and to the second time range occurs.

8. A control device of a controlled switch operating an electric power supply of a motor from an AC voltage source, comprising circuitry configured to:
   determine a characteristic of a variation of a voltage value across terminals of the controlled switch, the characteristic of the variation of the voltage value being a constant period of voltage value variations,
   determine a first time range based on the constant period of the voltage value variations, the first time range being less than the constant period of the voltage value variations,
   output a control signal to actuate closure of the controlled switch during the first time range; and
   use a triggering time value defining a second time range, the second time range being the constant period of the voltage value variations, and the second time range being divided by a determined controlled switch closing commutation angle,
   wherein said outputting the control signal to actuate closure of the controlled switch takes place as soon as a time common to the first time range and to the second time range occurs.

9. The control device according to claim 8, wherein the controlled switch comprises a thyristor.

10. A system, or an electric motor starting system, comprising the control device according to claim 8.

11. The method for controlling according to claim 5, wherein x = y.

12. The method for controlling according to claim 1, further comprising actuating closure of the controlled switch during the first time range responsive to the control signal, a moment of actuation being dependent on a value characteristic of a value of voltage across terminals of the controlled switch.

13. The method for controlling according to claim 1, wherein one or more of said determining the characteristic of the variation of the voltage value across the terminals of the controlled switch, said determining the first time range, and said outputting the control signal is performed using motor starting circuitry.

14. The method for controlling according to claim 1, wherein the second time range is evenly divided by the determined controlled switch closing commutation angle.

15. The method for controlling according to claim 1, wherein the first time range includes one or more portions corresponding to negative half-waves of an AC component of the voltage across the terminals of the controlled switch.

16. The method for controlling according to claim 1, further comprising:
- determining the second time range based on the constant period of the voltage value variations,
- wherein said outputting the control signal to actuate closure of the controlled switch is responsive to a determination of a first occurrence of overlap between the first and second time ranges.

* * * * *